US009739617B2

(12) United States Patent
Vandanapu et al.

(10) Patent No.: US 9,739,617 B2
(45) Date of Patent: Aug. 22, 2017

(54) NAVIGATION SYSTEM WITH PROMPT MECHANISM AND METHOD OF OPERATION THEREOF

(71) Applicant: Telenav, Inc., Sunnyvale, CA (US)

(72) Inventors: Naveen Kumar Vandanapu, Sunnyvale, CA (US); Gregory Stewart Aist, San Mateo, CA (US)

(73) Assignee: Telenav, Inc., Santa Clara, CA (US)

( * ) Notice: Subject to any disclaimer, the term of this patent is extended or adjusted under 35 U.S.C. 154(b) by 69 days.

(21) Appl. No.: 14/949,447

(22) Filed: Nov. 23, 2015

(65) Prior Publication Data

US 2017/0146348 A1    May 25, 2017

(51) Int. Cl.
*G01C 21/20* (2006.01)
*G01C 21/36* (2006.01)

(52) U.S. Cl.
CPC ......... *G01C 21/20* (2013.01); *G01C 21/3626* (2013.01)

(58) Field of Classification Search
CPC ....... G01C 21/20; G01C 21/3626; G06F 8/38; G08G 1/163; H04M 3/42348
See application file for complete search history.

(56) References Cited

U.S. PATENT DOCUMENTS

| 8,224,300 | B2   | 7/2012  | Silva |
| 8,275,348 | B2   | 9/2012  | Yen et al. |
| 8,600,391 | B2   | 12/2013 | Vendrow et al. |
| 8,966,366 | B2 * | 2/2015  | Tom .................. G06F 8/38 348/836 |
| 9,007,198 | B2 * | 4/2015  | Gunaratne ............ G08G 1/163 340/439 |
| 9,258,673 | B2 * | 2/2016  | Vendrow ........... H04M 3/42348 |
| 2010/0128867 | A1 | 5/2010  | Vendrow et al. |

* cited by examiner

*Primary Examiner* — Richard Camby
(74) *Attorney, Agent, or Firm* — IP Investment Law Group

(57) ABSTRACT

A method of operation of a navigation system includes: determining a navigation distance based on comparing a current location and a guidance point; determining a connection mode based on comparing a mode threshold distance and the navigation distance; detecting a communication initiation information for initiating a communication session; and generating a guidance notification with a control unit based on detecting the communication initiation information during the connection mode representing the mode threshold distance meeting or exceeding the navigation distance for presenting on a device.

20 Claims, 6 Drawing Sheets

NAVIGATION SYSTEM WITH PROMPT MECHANISM AND METHOD OF OPERATION THEREOF

TECHNICAL FIELD

The present invention relates generally to a navigation system, and more particularly to a system with prompt mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without prompt mechanism to present the guidance notification at a timing relevant to the user has become a paramount concern for the consumer. The inability decreases the benefit of using the tool.

Thus, a need still remains for a navigation system with prompt mechanism to optimally present the guidance notification for the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a navigation distance based on comparing a current location and a guidance point; determining a connection mode based on comparing a mode threshold distance and the navigation distance; detecting a communication initiation information for initiating a communication session; and generating a guidance notification with a control unit based on detecting the communication initiation information during the connection mode representing the mode threshold distance meeting or exceeding the navigation distance for presenting on a device.

The present invention provides a navigation system, including: a control unit for; determining a navigation distance based on comparing a current location and a guidance point, determining a connection mode based on comparing a mode threshold distance and the navigation distance, detecting a communication initiation information for initiating a communication session, generating a guidance notification based on detecting the communication initiation information during the connection mode representing the mode threshold distance meeting or exceeding the navigation distance, and a communication interface, coupled to the control unit, for communicating the guidance notification for presenting on a device.

The present invention provides a non-transitory computer readable medium including instructions for execution, the instructions comprising: determining a navigation distance based on comparing a current location and a guidance point; determining a connection mode based on comparing a mode threshold distance and the navigation distance; detecting a communication initiation information for initiating a communication session; and generating a guidance notification based on detecting the communication initiation information during the connection mode representing the mode threshold distance meeting or exceeding the navigation distance for presenting on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
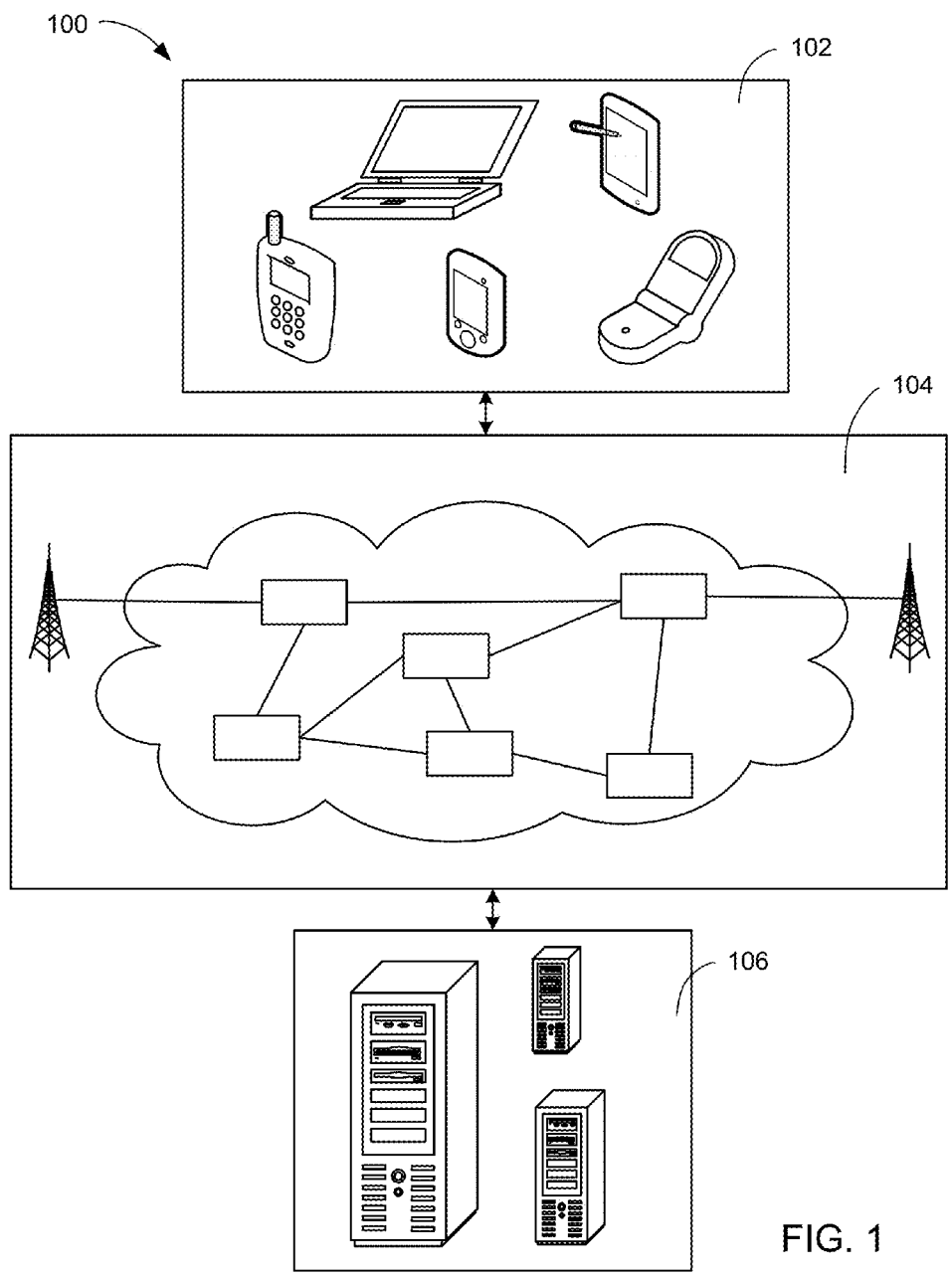
FIG. 1 is a navigation system with prompt mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with map mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2A:
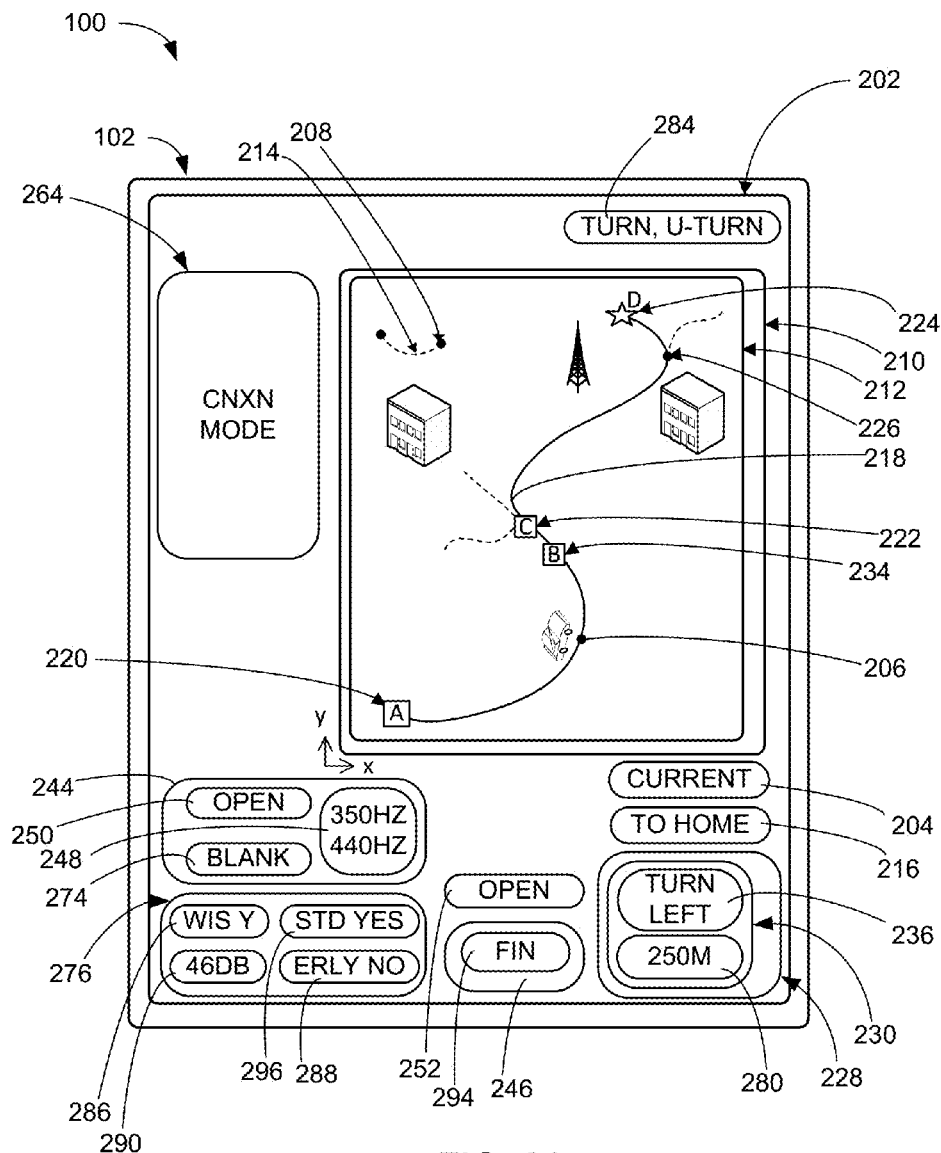
FIG. 2A is an example of a navigation information of the navigation system.

Referring now to FIG. 2A, there is shown an example of a navigation information 202 of the navigation system 100. For clarity and brevity, the various embodiments will be described with the first device 102 delivering the result generated by the navigation system 100. However, the first device 102 and the second device 106 of FIG. 1 can be discussed interchangeably.

The navigation information 202 is defined as information provided by the navigation system 100. For example, the navigation information 202 can include status information 204, a map information 210, a route information 216, or a combination thereof. The status information 204 is defined as information indicating a state, a condition, or a combination thereof of or relating to the first device 102. For example, the status information 204 can include a current location 206.

The current location 206 is defined as present geographic position information of the first device 102. For example, the current location 206 can represent a physical location 208 of the first device 102 at the present instance of the time.

The physical location 208 is defined as positional information. For example, the physical location 208 can be represented by a geographic latitude and longitude based on the Cartesian coordinate system. In another example, the physical location 208 can be represented by a mailing address.

The navigation information 202 can also include map information 210. The map information 210 can represent a diagram or a collection of data representing an arrangement or distribution of physical feature, non-physical feature, or a combination thereof of the geographic location on a map 212. The map information 210 can include a physical feature such as a path 214, the map 212, a road sign, an infrastructure, a geographical feature, a natural topology, or a combination thereof. The map information 210 can also include a non-physical feature such as a speed limit, a one-way designation, an address, or a combination thereof.

The path 214 is defined as a passage connecting the geographic location to another geographic location. For example, the path 214 can be the passage for navigation connecting an instance of the physical location 208 to another instance of the physical location 208.

The map 212 is defined as a graphical representation of the physical world. For example, the map 212 can be a representation of a spatial relationship between the physical features of the geographic area. In a specific example, the map 212 can be fixed on a tangible medium such as a paper or a globe or a display screen. In a different example, the map 212 can be in the form of information such as a data. The map information 210 is not limited to the diagram or a collection of data representing the arrangement or distribution of the physical feature of the geographic locations on the map 212 and can include various other real world situation as well.

For example, the map information 210 can include information for traveling representing the information for traversing the path 214. For a specific example, the information for traversing the path 214 can include a traffic signal, a traffic sign, a toll booth, a freeway entrance, a freeway exit, or a combination thereof. In another example, the information for traversing can also represent information not present in the physical world. For a specific example, the information for traversing can include a speed limit for a particular instance of the path 214, even though a speed limit sign itself may not be present in the physical world for that particular instance of the path 214.

The route information 216 is defined as information of a drive route 218. For example, the route information 216 can include the physical location 208 or a combination of a plurality of the physical location 208 included in the path 214 for the first device 102 to travel. For a specific example, the route information 216 can include the drive route 218, a start point 220, a way point 222, a destination point 224, or a combination thereof.

The drive route 218 is defined as the path 214 for travel. As an example, the first device 102 can display the path 214. The drive route 218 can include the path 214 connecting the physical location 208 to another instance of the physical location 208 intended for the first device 102 to travel. For a specific example, the physical location 208 connected by the drive route 218 can include the start point 220, the way point 222, the destination point 224, or a combination thereof. The drive route 218 can also be represented based on the combination of the physical location 208.

The start point 220 is defined as the physical location 208 representing the beginning of the drive route 218. For example, the start point 220 can be an instance of the physical location 208 designated or obtained by the navigation system 100 where the travel begins. For a specific example, if the start point 220 is not designated or obtained, the current location 206 can be used as the start point 220.

The way point 222 is defined as the physical location 208 prior to arriving at the destination point 224 and a potential stopping location. The way point 222 can be the instance of the physical location 208 designated or obtained by the navigation system 100 along the drive route 218 between the start point 220 and the destination point 224. If the way point 222 is not designated or obtained by the navigation system 100, the path 214 representing the drive route 218 can directly connect the start point 220 to the destination point 224.

The destination point 224 is defined as an instance of the physical location 208 where the drive route 218 ends. For example, the drive route 218 can include one instance of the destination point 224. For another example, if a new instance of the destination point 224 is determined, the older instance of the destination point 224 can be converted to a new instance of the way point 222.

For a specific example, the physical location 208 denoted "A" of FIG. 2A can represent the start point 220 and the physical location 208 denoted "C" of FIG. 2A can represent the destination point 224. In this example, if the navigation system 100 determines the physical location denoted "D" of FIG. 2A as a new instance of the destination point 224, the "C" can be converted into the new instance of the way point 222.

In another example, the route information 216 can include a guidance point 226. The guidance point 226 is defined as the physical location 208 where the information for assisting the travel of the drive route 218 is linked. For example, the guide information 228 can represent the information for assisting the travel along the drive route 218. The guide information 228 representing the information for assisting the travel along the drive route 218 can be linked to the physical location 208 in various ways. For example, the guide information 228 can be linked to the physical location 208 based on the metadata, the Cartesian coordinate system, or a combination thereof. The guide information 228 can be stored in the first device 102, the second device 106, or a combination thereof.

For a specific example, the guidance point 226 can represent the physical location 208 representing the start point 220, the way point 222, or the destination point 224. In a different example, the guidance point 226 can represent the other instances of the physical location 208 based on the guide information 228 linked to the physical location 208.

The guide information 228 is defined as information for assisting the travel along the drive route 218. For example, the guide information 228 can include a guide template 230, a notice distance 280, a guide type 236, or a combination thereof. The guide information 228 can be retrieved by the navigation system 100 or generated by the navigation system 100 based on the drive route 218 and the direction of travel.

An approaching point 234 is defined as a next instance of the guidance point 226 for the first device 102 to navigate. For example, the approaching point 234 can represent the next instance of the guidance point 226 from the current location 206 along the drive route 218 in the direction of the destination point 224. For example, if a current location 206 is illustrated by the vehicle in FIG. 2A, the "B" of FIG. 2A can represent the approaching point 234 since "B" is the next instance of the guidance point 226 after the current location 206.

The notice distance 280 is defined as a metric used for comparison to display the driving instruction. For example, the notice distance 280 can be used as the metric used for comparison to prompt a guidance notification 276 representing the driving instruction. For a specific example, the notice distance 280 can be represented by alphanumerical value of 0 through 9, A through Z, or a combination thereof. In this specific example, "1 km (kilometer)" can represent the notice distance 280 of 1 km.

The guide template 230 is defined as a prescribed form of the guidance notification 276. For example, the guide template 230 can be represented by the alphanumeric value of 0 through 9, A through Z, or a combination thereof. The guide template 230 can include the guide type 236, the notice distance 280, or a combination thereof. For example, the guide type 236 and the notice distance 280 can be inserted in the prescribed sections of the guide template 230. For example, "Next, 'guide type 236' in 'notice distance 280'" can represent the guide template 230 with the single quotation representing the prescribed sections. In this example, if the guide type 236 represents "turn left" and the notice distance 280 represents "1 km", the resulting instance of the guidance notification 276 can be "Next, 'turn left' in '1 km'."

The guide type 236 is defined as an instruction directing the vehicle movement. For example, the guide type 236 can include an instruction of the vehicle movement based on the current location 206 and the drive route 218. For a specific example, the guide type 236 can include the "turn right", the "turn left", the "continue straight", the "stop", or a combination thereof for the guidance point 226. The instruction of the movement is not limited to the examples listed above and can include other instruction for directing the vehicle movement.

In a specific example for the guide type 236 generated based on the current location 206 and the drive route 218, the guide type 236 for the way point 222 denoted "C" of FIG. 2A can represent the driving instruction of "turn right." In this specific example, the guide type 236 "turn right" can be generated since the drive route 218 guides the user of the first device 102 to turn right at C, as opposed to two other instances of the path 214 veering the user straight or left, away from the drive route 218.

A communication initiation information 244 is defined as an information for requesting the opening of a communication session 252. For example, the communication session 252 can be opened based on the first device 102 retrieving the communication initiation information 244. The communication initiation information 244 can include an inbound request 274, an outbound request 250, or a combination thereof.

The inbound request 274 is defined as the communication initiation information 244 received by the first device 102. The inbound request 274 can be based on various types of information. For example, the inbound request 274 can be based on a data packet 246, a pre-determined dial tone 248, or a combination thereof.

The outbound request 250 is defined as the communication initiation information 244 generated by the first device 102. For example, the outbound request 250 can be represented by the data packet 246, the pre-determined dial tone 248, or a combination thereof.

The pre-determined dial tone 248 is defined as information sent by a telephony device to a terminating device to request the opening of the communication session 252. For example, the pre-determined dial tone 248 can be composed of a multi-frequency sound transmitted by the second device 106 to the first device 102 to initiate the communication session 252.

For a specific example, the pre-determined dial tone 248 can be composed of 90 volts alternating current signal at the frequency of 20 Hertz. Alternatively, for digital mobile phones, because the communication method is based on the digital signal, the pre-determined dial tone 248 can be composed of information based on a communication protocol.

The data packet 246 is defined as the group of information compiled into a package for transmission through the communication path 104 of FIG. 1. For example, the data packet 246 can be used to transmit information based on the Internet Protocol (IP) for transmitting through the Web or other kinds of networks. For a specific example, the data packet 246 can be based on the Session Initiation Protocol (SIP), the H.323 of the ITU Telecommunication, the Media Gateway Control Protocol (MGCP), or a combination thereof.

The guidance notification 276 is defined as a guidance instruction for navigating of the drive route 218. For example, the guidance notification 276 can be based on the guide information 228, the guide template 230, a connection mode 264, a guidance volume 290, an priority guidance database 284, a whisper option 286, or a combination thereof. For a specific example, the guidance notification 276 can represent a standard distance notification 296, an early distance notification 288, or a combination thereof.

Figure 2B:
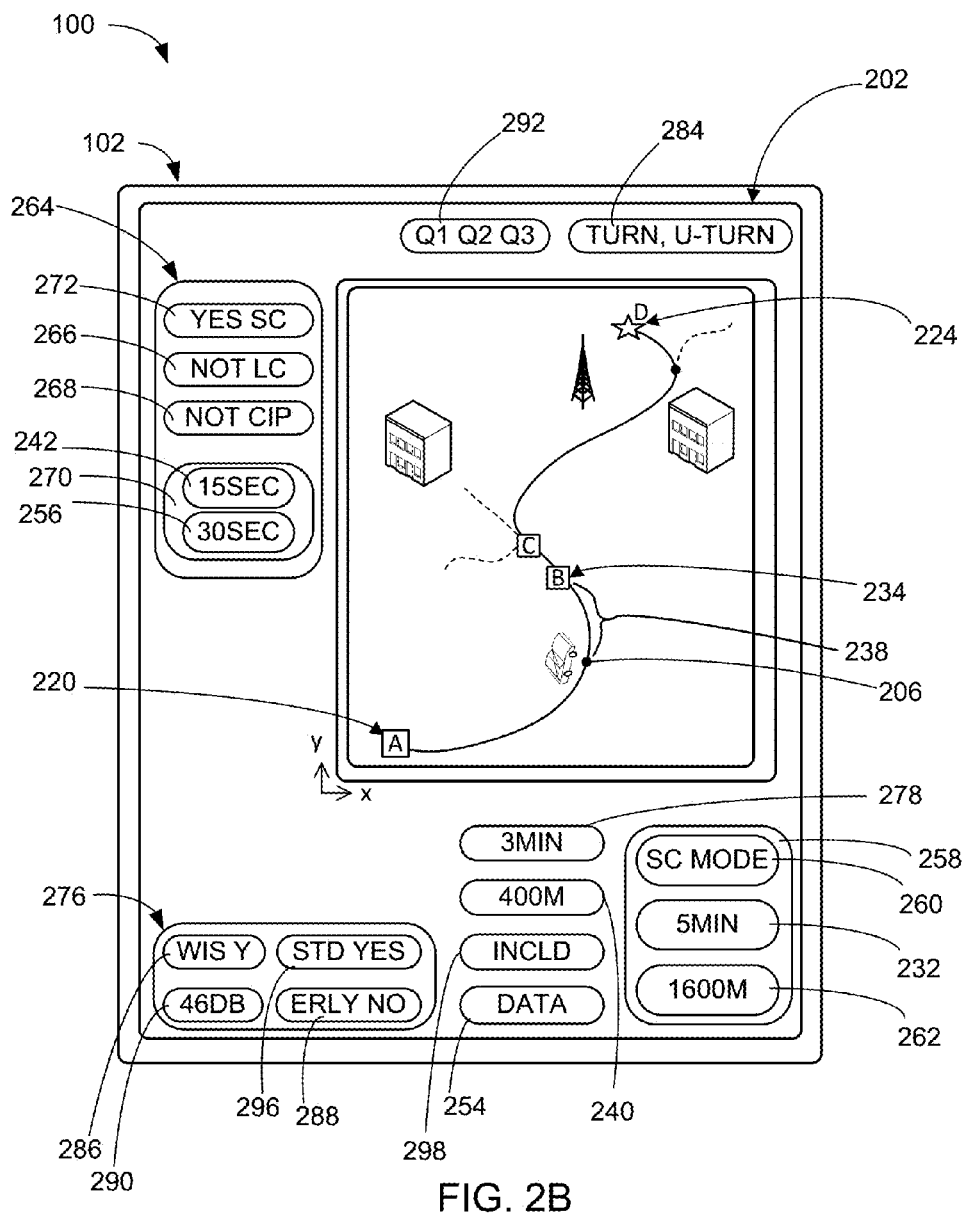
FIG. 2B is a further examples of a navigation information of the navigation system.

Referring now to FIG. 2B, there is shown an additional example of the navigation information 202 of the navigation system 100. For clarity and brevity, the embodiment of the present invention will be described with the first device 102 delivering the result generated by the navigation system 100. However, the first device 102 and the second device 106 of FIG. 1 can be discussed interchangeably.

The communication session 252 of FIG. 2A is defined as a state allowing the transceiving of a communication information 254. The communication session 252 can be established to allow the transceiving of the communication information 254 to another device through the communication path 104 of FIG. 1. For example, the communication session 252 can include a state of the first device 102 transmitting the communication information 254 to the second device 106 of FIG. 1 through the communication path 104. In another example, the communication session 252 can include a state of the first device 102 receiving of the communication information 254 from the second device 106 through the communication path 104.

The communication information 254 is defined as information including an interaction 298. For example, the communication information 254 can include the interaction 298 communicated via the first device 102, the second device 106, or a combination thereof. In a different example, the communication information 254 can include the interaction 298 by the user of the first device 102, the user of the second device 106, or a combination thereof. In this example, the communication information 254 can include an audio capture of an oral dialogue, a combination of the alphanumeric value representing a text chat, a still picture or a motion image representing a visual communication such as hand sign, or a combination thereof.

The interaction 298 is defined as an interactive exchange of information. For example, the interaction 298 can represent a communication between two or more devices. In another example, the interaction 298 can be an interactive exchange of information between two or more users.

A session terminating information 294 is defined as information designating the end of the communication session 252. For example, the communication information 254 transceived by the device can include the session terminating information 294. For a specific example, the information designating the end of the communication session 252 can be represented by the statement "SESSION_DESTROY( )" for the communication session 252 based on the PHP (PHP:Hypertext Preprocessor) language.

A mode information 258 is defined as information for determining the operation method of the navigation system 100. For example, the mode information 258 can include a mode selection 260, a navigation distance 238, a mode threshold distance 262, a navigation time 278, a mode threshold time 232, or a combination thereof.

The mode selection 260 is defined as a designator of the operation method of the navigation system 100. For example, the mode selection 260 can designate the operation mode of the navigation system 100 based on the entry made to the first device 102. For a specific example, the mode selection 260 can designate the connection mode 264 representing a standard connect mode 272, a limited connect mode 266, a call in progress mode 268, or a combination thereof.

The mode threshold distance 262 is defined as a metric used for comparison to determine the operation method based on physical proximity between the first device 102 and the guidance point 226 of FIG. 2A. For example, the mode threshold distance 262 can be used for comparison to determine the connection mode 264 of the navigation system 100. For a specific example, the alphanumerical value of A through Z, 1 through 9, or a combination thereof can represent the mode threshold distance 262. In this specific example, "1000 meter (m)" can represent the mode threshold distance 262 of 1000 meters.

The navigation distance 238 is defined as a distance along the drive route 218 of FIG. 2A between the current location 206 and the next destined instance of the guidance point 226. The navigation distance 238 can be expressed in a Euclidian system. For example, the navigation distance 238 can represent the distance of the drive route 218 between the current location 206 and the approaching point 234. For a specific example, the navigation distance 238 can represent the distance between "B" of FIG. 2B representing the approaching point 234 and the current location 206 indicated by the vehicle of FIG. 2B. In this example, "B" can be in the direction towards the destination point 224 from the current location 206.

The mode threshold time 232 is defined as a metric used for comparison to determine the operation method based on the traversal duration between the current location 206 and the approaching point 234. For example, the mode threshold time 232 can be used for comparison to determine the connection mode 264 of the navigation system 100. For a specific example, the alphanumerical value of A through Z, 1 through 9, or a combination thereof can represent the mode threshold time 232. In this specific example, "1000 meter (m)" can represent the mode threshold time 232 of 1000 meters.

The navigation time 278 is defined as a time required for the first device 102 to traverse along the drive route 218 between the current location 206 and the guidance point 226. For example, the navigation time 278 can be the time required for the first device 102 to traverse between the current location 206 and the approaching point 234. The navigation time 278 can be expressed in a decimal time system, a metric time system, or a combination thereof.

For a specific example, the navigation time 278 can represent the time required to traverse between "B" of FIG. 2B representing the approaching point 234 and the current location 206 indicated by the vehicle of FIG. 2B. In this example, "B" can be in the direction towards the destination point 224 from the current location 206.

The connection mode 264 is defined as an operation method of the navigation system 100. The connection mode 264 can include various operation methods of the navigation system 100. For example, the connection mode 264 can represent the operation method for initiating the communication session 252 of the navigation system 100.

The standard connect mode 272 is defined as the connection mode 264 for a situation where the navigation distance 238 is longer than the mode threshold distance 262. For a specific example, the connection mode 264 can represent the standard connect mode 272 when the navigation distance 238 represents 4,000 m and the mode threshold distance 262 represents 3,200 m. In another example, the connection mode 264 can represent the standard connect mode 272 when the standard connect mode 272 is designated as the connection mode 264 based on the mode selection 260.

The limited connect mode 266 is defined as the connection mode 264 for a situation where the navigation distance 238 is equal to or less than the mode threshold distance 262. For a specific example, the connection mode 264 can represent the limited connect mode 266 when the navigation distance 238 represents 3,000 m and the mode threshold distance 262 represents 3,200 m. In another example, the connection mode 264 can represent the LC mode 266 if the Limited connect mode 266 is designated as the connection mode 264 based on the mode selection 260.

The call in progress mode 268 is defined as the connection mode 264 for a situation where the communication information 254 is transceived by the first device 102. For example, the first device 102 operating at the connection mode 264 representing the call in progress mode 268 can receive the communication information 254 transmitted by the second device 106. In this example, the audio data based on the interaction 298 captured and transmitted by the second device 106 can be received by the first device 102.

In another example, the first device 102 operating at the call in progress mode 268 can transmit the communication information 254 captured by the first device 102. In this example, the audio data based on the interaction 298 captured by the first device 102 can be transmitted by the first device 102 and received by the second device 106. The connection mode 264 can also represent the call in progress mode 268 based on the call in progress mode 268 designated as the connection mode 264 based on the mode selection 260.

A silent state 270 is defined as the state of the navigation system 100 where the communication is not taking place. For example, the silent state 270 can be the state of the navigation system 100 where the communication information 254 transceived by the first device 102 does not include the interaction 298.

In a specific example, the silent state 270 can represent the state of the first device 102 in the call in progress mode 268 where duration of the silence of the interaction 298 is longer than a pre-determined length. In this specific example, the silent state 270 can represent the state of the first device 102 where a silence length 256 is longer than a silence threshold 242.

The silence length 256 is defined as the duration where the interaction 298 is not taking place. For example, the silence length 256 can represent the duration of the navigation system 100 in the silent state 270. More specifically, the silence length 256 can represent the duration of the first device 102 transceiving the communication information 254 with the data packet 246 of FIG. 2A not including the interaction 298. For a specific example, the silence length 256 can be based on the unit of time represented by the alphanumeric value of 0 to 9, A to Z, or a combination thereof. For example, the silence length 256 can be represented as "30 sec (seconds)" to represent the duration of the first device 102 transceiving the communication information 254 not containing the interaction 298 for 30 seconds.

The silence threshold 242 is defined as a metric used for comparison to determine the silent state 270 of the navigation system 100. For a specific example, the silence threshold 242 can be represented by the alphanumeric value of 0 through 9, A through Z, or a combination thereof. In a specific example, "30 sec" can represent the silence threshold 242 of 30 seconds.

The guidance volume 290 is defined as a power and intensity (loudness) of an acoustic sound representing the guidance notification 276. For example, the guidance volume 290 can be presented in units of decibel (dB) for expressing the degree of the power and intensity of the sound. For a specific example, the guidance volume 290 can be represented based on the alphanumeric value of 0 to 9, A to Z, or a combination thereof. For example, the guidance notification 276 outputted at the guidance volume 290 of 150 dB can be prompted at the loudness comparable to the jet airplane taking off at 25 meters away from a person. In another example, the guidance notification 276 outputted at the guidance volume 290 of 10 dB can be prompted at the loudness comparable to the person breathing.

The standard distance notification 296 is defined as the guidance notification 276 for the navigation system 100 in the limited connect mode 266. For example, the standard distance notification 296 can be generated by the first device 102 based on the navigation system 100 operating in the connection mode 264 representing the limited connect mode 266.

The early distance notification 288 is defined as the guidance notification 276 for the navigation system in the standard connect mode 272. For example, the early distance notification 288 can be generated based on the navigation system 100 operating in the connection mode 264 representing the standard connect mode 272

The guide template 230 of FIG. 2A for the standard distance notification 296 can be different from the guide template 230 for the early distance notification 288. In a specific example, the guidance notification 276 representing the standard distance notification 296 can be "Next, 'guide type 236 of FIG. 2A' in 'notice distance 280'." In another example, the guidance notification 276 representing the early distance notification 288 can be "Early reminder, 'guide type 236' in 'notice distance 280'."

For clarity and brevity, the embodiment of the present invention will be described with the guidance notification 276 representing the standard distance notification 296. However, the guide template 230 for the standard distance notification 296 and the guide template 230 for the early distance notification 288 can be used interchangeably. For example, a section of the guide template 230 used in the standard distance notification 296 and the early distance notification 288 can be used interchangeably. In a specific example, the guide template 230 of the standard distance notification 296 can include the word "early reminder", and the early distance notification 288 can include the words "next" in the section such as the beginning of the guide template 230.

The whisper option 286 is defined as a feature for controlling the strength of the presentation included in the guidance notification 276. For example, the guidance notification 276 including the whisper option 286 can be prompted in various ways. For a specific example, the guidance notification 276 including the whisper option 286 can be prompted at the loudness of the guidance volume 290 included in the guidance notification 276 if the connection mode 264 represents the standard connect mode 272, the limited connect mode 266, or a combination thereof. In a different example, the guidance notification 276 including the whisper option 286 can be prompted at the reduced level of the guidance volume 290 if the connection mode 264 represents the call in progress mode 268.

A prompt queue 292 is defined as a sequence list of the guidance notification 276. For example, the prompt queue 292 can represent the sequence list of the guidance notification 276 waiting to be prompted, presented, or a combination thereof by the navigation system 100. The prompt queue 292 can queue multiple instances of the guidance notification 276. For example, if there is no instance of the guidance notification 276 in the prompt queue 292, there is no guidance notification 276 waiting to be prompted. In another example, when there are two instances of the guidance notification 276 in the prompt queue 292, one instance of the guidance notification 276 can be prompted before the other instance of the guidance notification 276.

The priority guidance database 284 is defined as a collection of the pre-determined instances of the guide type 236. For a specific example, the priority guidance database 284 including the pre-determined instances of the guide type 236 can represent "turn left," "turn right," "highway entrance," "highway exits," or a combination thereof. The guide type 236 included in the priority guidance database 284 can represent the classification of the driving instructions which can be important for driver to follow in order to stay on the drive route 218 during navigation. The pre-determined instance of the guide type 236 is not limited to the guide type 236 described above and can include other types of guidance important for assisting the travel of the first device 102.

A connection threshold distance 240 is defined as a metric used for comparison to determine the permissibility of transceiving the communication initiation information 244 of FIG. 2A. For example, the connection threshold distance 240 can be represented by an alphanumeric value of 0 to 9, A through Z, or a combination thereof. For a specific example, "200 m" can represent the connection threshold distance 240 of 200 meters.

The first device 102 can transceive the communication initiation information 244 based on the navigation distance 238 meeting or exceeding the connection threshold distance 240. For example, the first device 102 can halt the transceiving of the communication initiation information 244 at a further distance away from the approaching point 234 based on the increase in the distance of the connection threshold distance 240. In a different example, the first device 102 can transceive the communication initiation information 244 at a closer distance from the approaching point 234 based on the decrease in the distance of the connection threshold distance 240.

Figure 3:
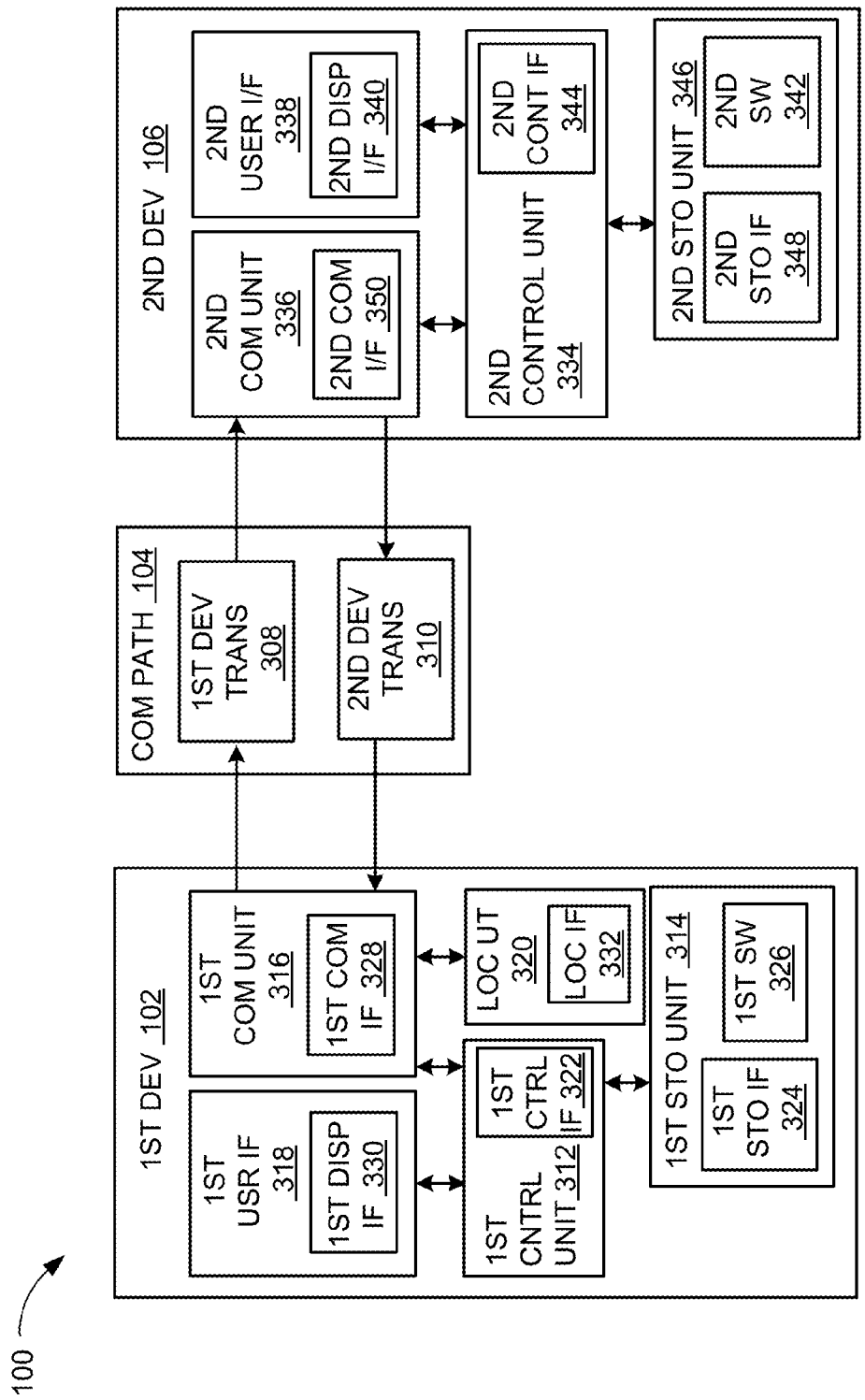
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate from the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a GPS, an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations physically separate from the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104.

The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, a camera, or any combination thereof to provide data and communication inputs.

The first user interface 318 can include a first display interface 330. The first display interface 330 can include a display, a projector, a video screen, a speaker, a headset, or any combination thereof.

The first control unit 312 can operate the first user interface 318 to present information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, a camera, or any combination thereof to provide data and communication inputs. Examples of the output device of the second user interface 338 can include a second display interface 340. The second display interface 340 can include a display, a projector, a video screen, a speaker, a headset, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to present information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations physically separate from the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations physically separate from the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
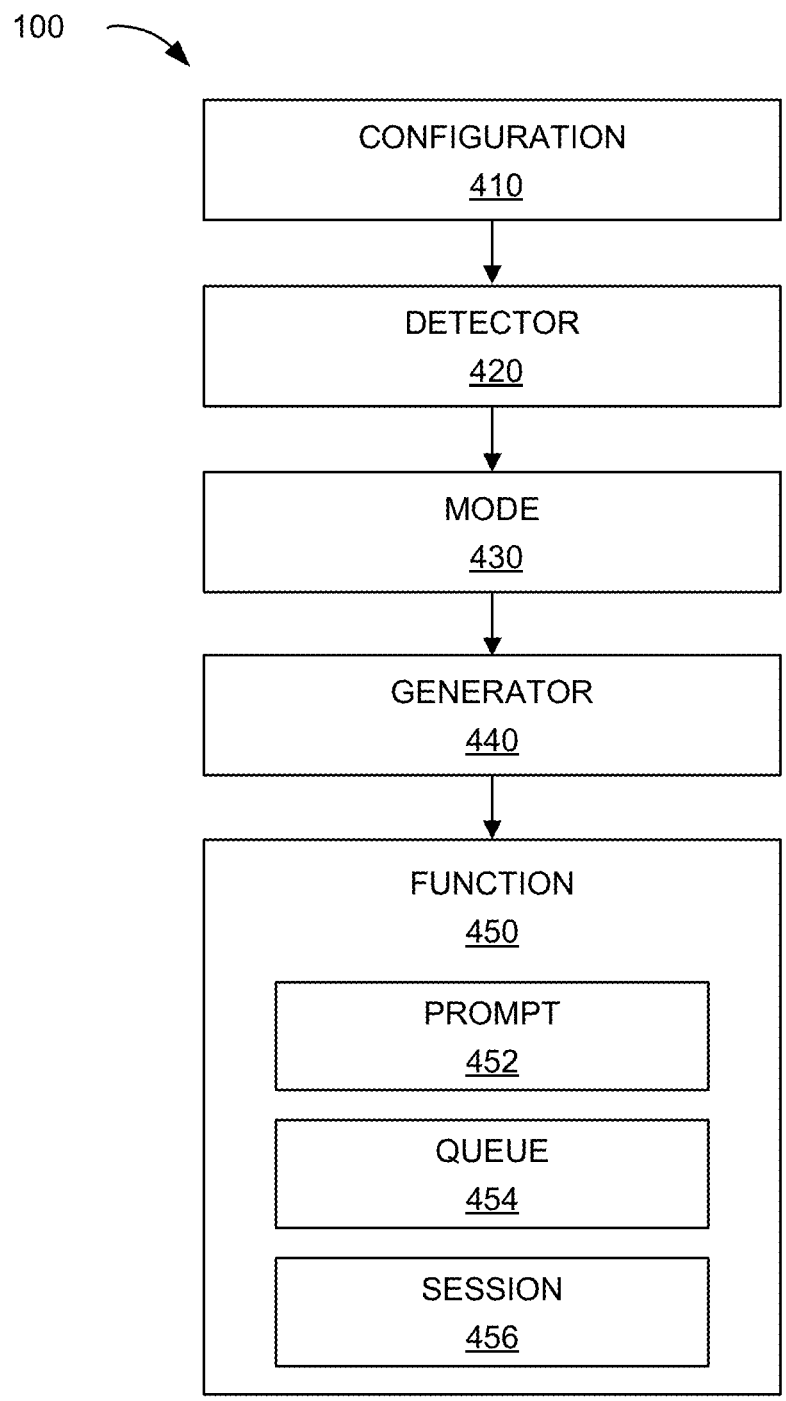
FIG. 4 is a control flow of the navigation system.

Referring now to FIG. 4, therein is shown a control flow of the navigation system 100. The navigation system 100 can include a configuration module 410. The configuration module 410 configures the navigation system 100. For example, the configuration module 410 can determine the status information 204 of FIG. 2A, the map information 210 of FIG. 2A, the route information 216 of FIG. 2A, or a combination thereof for configuring the navigation system 100. For further example, the configuration module 410 can determine the status information 204 including the current location 206 of FIG. 2A.

The configuration module 410 can determine the status information 204 in a number of ways. For example, the configuration module 410 can determine the physical location 208 of FIG. 2A representing the current location 206 based on the GPS signal, a beacon signal, an inertial measurement unit (IMU) data, or a combination thereof. In this example, the configuration module 410 can determine the current location 206 using trilateration based on the GPS signal, the cellular signal, or a combination thereof detected by the location unit 320 of FIG. 3.

The configuration module 410 can determine the physical location 208 presented in the Cartesian coordinate system. For example, the direction denoted by "x" of FIG. 2A can represent the lateral component of the physical location 208 based on the Cartesian coordinate system. In the same example, the direction denoted by "y" on FIG. 2A can represent the longitudinal component of the physical location 208 based on the Cartesian coordinate system. In this example, the physical location 208 can positively increase in value of x to represent the physical location 208 in the western direction of the geographical area, increasing in the longitude. The physical location 208 can increase in the value of y to represent the physical location 208 in the northern direction of the geographical area, increasing in the latitude value.

The configuration module 410 can determine the physical location 208 in the Cartesian coordinate system represented in the alphanumeric value of 0 to 9, A to Z, or a combination thereof for configuring the navigation system 100. For a specific example, the configuration module 410 can determine the physical location 208 of the Ferry Building in San Francisco, Calif. (CA) by retrieving the alphanumeric value in the ordered pair of "37.795029, −122.393087." For example, the configuration module 410 can retrieve the physical location 208 of the Ferry Building from the first device 102 of FIG. 1, the second device 106 of FIG. 1 through the communication path 104 of FIG. 1, or a combination thereof. Continuing in this example, the configuration module 410 can determine the first value of the ordered pair as the longitude component and the second value of the ordered pair as the latitude component of the physical location 208.

The configuration module 410 can determine the map information 210 in various ways. For example, the configuration module 410 can determine the map information 210 based on the elements included in the map 212 of FIG. 2A. For a specific example, the configuration module 410 can extrapolate the map information 210 including the path 214 of FIG. 2A, the road sign, the traffic signal, highway entrance, highway exits, or a combination thereof based on the elements included in the map 212.

For a specific example, the configuration module 410 can scan the map 212 to extrapolate the map information 210. For example, the configuration module 410 can scan the map 212 and extrapolate the map information 210 based on the physical location 208 of the elements on the map 212. In a specific example, the configuration module 410 can scan and extrapolate the map information 210 representing the traffic signal at the physical location 208 at the Cartesian coordinate of "44.0456, −122.9307" located at Springfield, Oreg., 97478.

The configuration module 410 can determine the route information 216 including the drive route 218 of FIG. 2A, the guidance point 226 of FIG. 2A, or a combination thereof. The configuration module 410 can retrieve the drive route 218 in various ways.

For example, the configuration module 410 can determine the drive route 218 based on the instances of the physical location 208 representing the start point 220 of FIG. 2A, the way point 222 of FIG. 2A, the destination point 224 of FIG. 2A, or a combination thereof. In this example, the configuration module 410 can determine the drive route 218 based on connecting the path 214 between the physical location 208 representing the start point 220, the way point 222, the destination point 224, or a combination thereof.

For a specific example, the configuration module 410 can retrieve the start point 220 denoted as "A" of FIG. 2A, the two instances of the way point 222 denoted as "B" and "C" of FIG. 2A, and the destination point 224 denoted as "D" of FIG. 2A. In this example, the configuration module 410 can determine the drive route 218 as the path 214 between "A" and "B," followed by the path 214 between the "B" and the "C," followed by the path 214 between the "C" and the "D."

In another specific example, if the configuration module 410 does not retrieve both instances of the way point 222 "B" and "C," the configuration module 410 can determine the drive route 218 based on the path 214 between the start point 220 and the destination point 224. In this example, the configuration module 410 can determine the drive route 218 as the path 214 between "A" and "D."

The configuration module 410 can also determine the drive route 218 by retrieving the path 214 between the current location 206 and the destination point 224 when the start point 220 and the way point 222 is not retrieved by the configuration module 410. In this specific example, the configuration module 410 can determine the drive route 218 based on the path 214 between the vehicle of FIG. 2A representing the current location 206 and "D" representing the destination point 224.

For a different example, the configuration module 410 can determine the guidance point 226 in various ways. For example, the configuration module 410 can determine the guidance point 226 based on the physical location 208 and the map information 210. In this example, the configuration module 410 can determine the guidance point 226 based on the presence of the map information 210 for the physical location 208.

In another example, the configuration module 410 can determine the guidance point 226 based on the drive route 218, the physical location 208, or a combination thereof. In this example, the configuration module 410 can trace the drive route 218 from the beginning of the drive route 218 to the destination point 224. If the configuration module 410 detects the street change along the drive route 218, the configuration module 410 can determine that instance of the physical location 208 as the guidance point 226. For a specific example, if the configuration module 410 detects the street of the drive route 218 changing into another street, the configuration module 410 can determine the physical location 208 where the change has occurred on the drive route 218 as the guidance point 226 with the guide type 236 of FIG. 2A of "turn."

In a different example, the configuration module 410 can trace the drive route 218 to determine the street merging with another street. In this example, the configuration module 410 can determine the physical location 208 of the merger as the guidance point 226 with the guide type 236 representing the road merge.

In another example, the configuration module 410 can trace the drive route 218 to detect the changing of the street from the highway type street to the non-highway type street. In this example, the configuration module 410 can determine the physical location 208 changing from the highway street to the non-highway street as the guidance point 226 with the guide type 236 representing the highway exit.

For another example, the configuration module 410 can trace the drive route 218 to detect the guide type 236 representing the traffic signal on the highway. In this example, the configuration module 410 can determine the physical location 208 of the traffic signal on the highway as the guidance point 226 with the guide type 236 representing the "Highway traffic signal."

During the tracing of the drive route 218, the configuration module 410 is not limited to determining one instance of the guidance point 226 but can determine multiple instances of the guidance point 226 based on the guide information 228 of FIG. 2A, such as changing the street, exiting the highway exit, passing the traffic signal, or a combination thereof.

The configuration module 410 can determine the guidance point 226 representing the approaching point 234 of FIG. 2A in various ways. For example, the configuration module 410 can determine the approaching point 234 based on the drive route 218, the current location 206, the guidance point 226, or a combination thereof. In this example, the configuration module 410 can trace the drive route 218 from the current location 206 toward the destination point 224 and determine the first instance of the guidance point 226 as the approaching point 234.

The configuration module 410 can determine the navigation distance 238 of FIG. 2B in various ways. For example, the configuration module 410 can determine the navigation distance 238 based on the current location 206, the drive route 218, the approaching point 234, or a combination thereof. For further example, the configuration module 410 can measure the distance of the drive route 218 between the current location 206 and the approaching point 234. For additional example, the configuration module 410 can measure the distance between the current location 206 representing the vehicle of FIG. 2A and the approaching point 234 representing "B" of FIG. 2A. In this example, the current location 206 can be located 700 m from "A" denoting the start point 220 and the approaching point 234 can be located 1,200 m from the start point 220. In this example, the configuration module 410 can measure the distance between the current location 206 and the approaching point 234 to determine the navigation distance 238 of 500 m.

The configuration module 410 can determine the connection threshold distance 240 of FIG. 2B in various ways. For example, the configuration module 410 can determine the connection threshold distance 240 based on retrieving the connection threshold distance 240 from the first device 102, the second device 106, the first user interface 318, or a combination thereof.

The configuration module 410 can determine the silence threshold 242 of FIG. 2B in various ways. For example, the configuration module 410 can access the first device 102, the second device 106, or a combination thereof to retrieve the silence threshold 242. In another example, the configuration module 410 can determine the silence threshold 242 based on the entry captured on the first user interface 318. For example, the configuration module 410 can capture the combination of the alphanumeric value of 0 through 9 and A through Z representing the silence threshold 242 with the first user interface 318. In this example, the user entry representing "30 sec" can be captured by the first user interface 318 such as a touch screen monitor to determine the silence threshold 242 representing 30 seconds.

The configuration module 410 can retrieve the guide template 230 of FIG. 2A in various ways. For example, the configuration module 410 can access the first device 102, the second device 106, or a combination thereof to retrieve the guide template 230. In a specific example, the configuration module 410 can access the first storage unit 314 to retrieve the combination of the alphanumeric value of 0 through 9 and A through Z representing the guide template 230. In this specific example, the configuration module 410 can retrieve "Next, _____ in _____" representing the guide template 230 from the first storage unit 314 of FIG. 3, the second storage unit 346 of FIG. 3, or a combination thereof. In this example, the configuration module 410 can insert the guide type 236, the notice distance 280 of FIG. 2A, or a combination thereof in the underlined section of the guide template 230.

The configuration module 410 can determine the notice distance 280 in various ways. For example, the configuration module 410 can access the first device 102, the second device 106, or a combination thereof to retrieve and determine the notice distance 280. In a specific example, the configuration module 410 can access the first storage unit 314, the second device 106 through the first communication unit 316, or a combination thereof to retrieve the alphanumeric value of 0 through 9, A through Z, or a combination thereof representing the notice distance 280. For example, the configuration module 410 can retrieve the alphanumeric combination of "1000 m" representing the distance of 1000 meters as the notice distance 280.

In another example, the configuration module 410 can also determine the notice distance 280 based on the entry captured on the first user interface 318. In this example, the configuration module 410 can retrieve the alphanumeric value of 0 through 9, A through Z, or a combination thereof representing the notice distance 280. For example, the configuration module 410 can capture the alphanumeric combination of "2,000 m" to determine the notice distance 280 of 2,000 meters based on the entry captured on the first user interface 318.

The navigation system 100 can include a detector module 420, which can couple to the configuration module 410. The detector module 420 detects the communication initiation information 244 of FIG. 2A, the communication information 254 of FIG. 2B, or a combination thereof. For example, the detector module 420 can detect the communication initiation information 244 including the inbound request 274 of FIG. 2A, the outbound request 250 of FIG. 2A, or a combination thereof in various ways.

For example, the detector module 420 can detect the inbound request 274 based on receiving the communication initiation information 244 represented in the data packet 246 of FIG. 2A, the pre-determined dial tone 248 of FIG. 2A, or a combination thereof from the second device 106 communicated through the first communication unit 316.

In a different example, the detector module 420 can detect the inbound request 274 based on receiving the alphanumeric value of 0 to 9, A to Z, or a combination thereof representing the inbound request 274. For a specific example, the detector module 420 can detect the inbound request 274 based on the presence of the alphanumeric combination "INVITE" in the data packet 246 passing through the first communication unit 316 for SIP (Session Initiation Protocol) packet. In a different example, the detector module 420 can detect the inbound request 274 based on detecting the pre-determined dial tone 248 from the second device 106 by the first communication unit 316.

The detector module 420 can detect the outbound request 250 in various ways. For example, the detector module 420 can detect the outbound request 250 based on a transmission of the communication initiation information 244 representing the data packet 246, the pre-determined dial tone 248, or a combination thereof by the first communication unit 316.

For a specific example, the detector module 420 can detect the outbound request 250 based on detecting the transmission of the alphanumeric value of 0 to 9, A to Z, or a combination thereof generated by the first device 102 through the first communication unit 316. For example, the detector module 420 can detect the outbound request 250 based on the transmission of the "CALL" representing the combination of the alphanumeric value in the data packet 246.

The detector module 420 detecting the outbound request 250 is not limited to the combination of the alphanumeric value "CALL" and can detect the outbound request 250 based on other communication initiation information 244. For example, the detector module 420 can detect the outbound request 250 based on the transmission of the pre-determined dial tone 248 generated by the first device 102 through the first communication unit 316.

The detector module 420 can detect the communication information 254 in various ways. For example, the detector module 420 can detect the communication information 254 based on detecting the analog telephony signal, the digital telephony signal, or a combination thereof passing through the first communication unit 316. In another example, the detector module 420 can detect the communication information 254 based on detecting the interaction 298 of FIG. 2B in the data packet 246 transceived through the first communication interface 328.

The detector module 420 can determine the state of the first device 102 representing the communication session 252 FIG. 2A in various ways. For example, the detector module 420 can determine the state of the first device 102 representing the communication session 252 based on detecting the communication information 254 transceived through the first communication unit 316. The detector module 420 can also determine the state of the first device 102 representing the communication session 252 based on detecting the established instance of the communication path 104 between the first device 102 and the second device 106.

The detector module 420 can determine the silence length 256 of FIG. 2B based on measuring the communication information 254. For example, the detector module 420 can determine the silence length 256 based on measuring the duration of the communication information 254 transceived during the communication session 252 that does not include the interaction 298. For a specific example, if the communication information 254 does not include the interaction 298 for 20 seconds of the communication session 252, the detector module 420 can determine the silence length 256 as 20 seconds.

The navigation system 100 can include a mode module 430, which can couple to the detector module 420. The mode module 430 determines the connection mode 264 of FIG. 2A of the navigation system 100. For example, the mode module 430 can determine the connection mode 264 representing the standard connect mode 272 of FIG. 2B, the limited connect mode 266 of FIG. 2B, the call in progress mode 268 of FIG. 2B or a combination thereof. The mode module 430 can determine the connection mode 264 in various ways.

For example, the mode module 430 can determine the connection mode 264 based on the mode information 258 of FIG. 2B. In a specific example, the mode module 430 can determine the connection mode 264 based on the mode selection 260 of FIG. 2B, the navigation distance 238, the mode threshold distance 262 of FIG. 2B, or a combination thereof.

For example, the mode module 430 can determine the connection mode 264 based on the mode selection 260 retrieved on the first user interface 318. In this example, if the mode module 430 retrieves the mode selection 260 representing the standard connect mode 272, the mode module 430 can determine the standard connect mode 272 as the connection mode 264. In a different example, if the mode module 430 retrieves the mode selection 260 representing the limited connect mode 266, the mode module 430 can determine the limited connect mode 266 as the connection mode 264. In another example, if the mode module 430 retrieves the mode selection 260 representing the call in progress mode 268, the mode module 430 can determine the call in progress mode 268 as the connection mode 264.

In a different example, the mode module 430 can determine the connection mode 264 based on the navigation distance 238, the mode threshold distance 262, or a combination thereof. In this example, the mode module 430 can compare the navigation distance 238 and the mode threshold distance 262 to determine the connection mode 264.

The mode module 430 can determine the mode threshold distance 262 in various ways. For example, the mode module 430 can determine the mode threshold distance 262 based on capturing the alpha numeric value of 0 to 9, A to Z, or a combination thereof by the first user interface 318. In this example, the combination of the alpha numeric value captured by the first user interface 318 can represent the mode threshold distance 262.

In a different example, the mode module 430 can retrieve the mode threshold distance 262 from the first storage unit 314, the first communication unit 316, or a combination thereof. For a specific example, the mode module 430 can retrieve the mode threshold distance 262 as 6000 m based on retrieving "6000 m" representing the combination of the alphanumeric value of A to Z, 0 to 9, or a combination thereof. In a different specific example, the mode module 430 can capture the mode threshold distance 262 as 6000 m based on retrieving the distance of 6000 m from the first storage unit 314, the first communication unit 316, or a combination thereof.

The mode module 430 can determine the connection mode 264 representing the standard connect mode 272 based on the approaching point 234 located further away than the predetermined distance. For example, the mode module 430 can determine the connection mode 264 representing the standard connect mode 272 if the navigation distance 238 is greater in value than the mode threshold distance 262. For a specific example, the current location 206 can be located at (0, 0), the approaching point 234 located at (100, 0) based on the Cartesian coordinate system, and the mode threshold distance 262 representing 50. In this specific example, based on the location of the current location 206 and the approaching point 234, the navigation distance 238 is 100. Based on the comparison between the navigation distance 238 of 100 and the mode threshold distance 262 of 50, the mode module 430 can determine the connection mode 264 to represent the standard connect mode 272 since the value of the navigation distance 238 is greater than the mode threshold distance 262.

In another example, the mode module 430 can determine the connection mode 264 representing the limited connect mode 266 based on the approaching point 234 located nearer than the predetermined distance. For example, the mode module 430 can determine the connection mode 264 representing the limited connect mode 266 if the navigation distance 238 is less than the value of the mode threshold distance 262. For a specific example, the current location 206 can be located at (0, 0), the approaching point 234 located at (100, 0) based on the Cartesian coordinate system, and the mode threshold distance 262 representing 120. In this specific example, based on the location of the current location 206 and the approaching point 234, the navigation distance 238 is 100. Based on the comparison between the navigation distance 238 of 100 and the mode threshold distance 262 of 120, the mode module 430 can determine the connection mode 264 to represent the limited connect mode 266 since the navigation distance 238 representing 100 is less than the mode threshold distance 262 representing 120.

In an alternative example, the mode module 430 can determine the connection mode 264 based on the navigation time 278 of FIG. 2B, the mode threshold time 232 of FIG. 2B, or a combination thereof. In this example, the mode module 430 can compare the navigation time 278 and the mode threshold time 232 to determine the connection mode 264.

The mode module 430 can determine the mode threshold time 232 in various ways. For example, the mode module 430 can determine the mode threshold time 232 based on capturing the alphanumeric value of 0 to 9, A to Z, or a combination thereof by the first user interface 318. In this example, the combination of the alpha numeric value captured can represent the mode threshold time 232.

In a different example, the mode module 430 can retrieve the mode threshold time 232 from the first storage unit 314, the first communication unit 316, or a combination thereof. For a specific example, the mode module 430 can retrieve the mode threshold time 232 as 2 minutes (min) based on retrieving "2 min" from the first storage unit 314, the first communication unit 316, or a combination thereof. In a different specific example, the mode module 430 an capture the mode threshold time 232 as 2 minutes based on capturing "2 min" representing the combination of the alphanumeric value of A to Z, 0 to 9, or a combination thereof by the first user interface 318.

The mode module 430 can determine the navigation time 278 in various ways. For example, the mode module 430 can determine the navigation time 278 by retrieving the navigation time 278 from the first storage unit 314, the first communication unit 316, or a combination thereof.

In a different example, the mode module 430 can determine the navigation time 278 based on the current speed and the navigation distance 238. In a specific example, the mode module 430 can divide the navigation distance 238 by the current speed to determine the navigation time 278. For example, for the navigation distance 238 representing 200 km and the current speed representing 100 km/hr, the mode module 430 can determine the navigation time 278 of 2 hours.

The mode module 430 can determine the connection mode 264 representing the standard connect mode 272 based on the navigation time 278 greater than the predetermined time. For example, the mode module 430 can determine the connection mode 264 representing the standard connect mode 272 if the navigation time 278 is greater in value than the mode threshold time 232. For a specific example, the navigation time 278 can represent 20 minutes and the mode threshold time 232 can represent 5 minutes. Based on the comparison between the navigation time 278 and the mode threshold time 232, the mode module 430 can determine the connection mode 264 to represent the standard connect mode 272 since the value of the navigation time 278 is greater than the mode threshold time 232.

In another example, the mode module 430 can determine the connection mode 264 representing the limited connect mode 266 based on the navigation time 278 less than the predetermined time. For example, the mode module 430 can determine the connection mode 264 representing the limited connect mode 266 if the navigation time 278 is less than the value of the mode threshold time 232. For a specific example, the navigation time 278 can represent 3 minutes, and the mode threshold time 232 can represent 5 minutes. Based on the comparison between the navigation time 278 of 3 minutes and the mode threshold time 232 of 5 minutes, the mode module 430 can determine the connection mode 264 to represent the limited connect mode 266 since the value of the navigation time 278 is less than the mode threshold time 232.

In a different example, the mode module 430 can determine the connection mode 264 representing the call in progress mode 268 based on the communication information 254. For example, the mode module 430 can determine the connection mode 264 to represent the call in progress mode 268 based on detecting the ongoing communication by the first device 102. In a specific example, the mode module 430 can determine the connection mode 264 to represent the call in progress mode 268 based on detecting the communication information 254 transceived through the first communication unit 316.

The mode module 430 can determine the connection mode 264 representing the call in progress mode 268 to be in the silent state 270 of FIG. 2B in various ways. For example, the mode module 430 can compare the silence length 256 and the silence threshold 242 to determine the connection mode 264 representing the call in progress mode 268 to be in the silent state 270. For a specific example, the mode module 430 can determine the call in progress mode 268 to be in the silent state 270 if the duration of the silence length 256 is equal to or greater in value than the silence threshold 242.

The navigation system 100 can include a generator module 440, which can couple to the mode module 430. The generator module 440 generates the guidance notification 276 of FIG. 2B of the navigation system 100. The generator module 440 can generate the guidance notification 276 in various ways. For example, the generator module 440 can generate the guidance notification 276 based on the connection mode 264, the guide information 228, the priority guidance database 284, the communication initiation information 244, or a combination thereof.

The generator module 440 can generate the guidance notification 276 based on the communication initiation information 244, the guide type 236, the guide template 230, the notice distance 280, or a combination thereof. In this example, the generator module 440 can generate the guidance notification 276 based on the guide type 236, the notice distance 280, the guide template 230, or a combination thereof when the detector module 420 detects the communication initiation information 244.

For a specific example, the generator module 440 can generate the guidance notification 276 based on the guide template 230 "Next, 'guide type 236' in 'notice distance 280'." In this specific example, the generator module 440 can generate the guidance notification 276 when the communication initiation information 244 is detected.

For example, the guide type 236 can represent "turn right" and the notice distance 280 can represent "2000 m". In this example, based on detecting the communication initiation information 244, the generator module 440 can combine the guide type 236 and the notice distance 280 by inserting "turn right" and "2000 m" into the guide template 230 to generate the guidance notification 276 "Next, 'turn right' in '2000 m'."

It has been discovered that the navigation system 100 generating the guidance notification 276 based on detecting the communication initiation information 244 improves the efficiency of operating the navigation system 100. More specifically, as an example, by generating the guidance notification 276 based on detecting the communication initiation information 244, the timing of generating the guidance notification 276 can be configured by the navigation system 100. For example, the timing of generating the guidance notification 276 can be configured to just prior to prompting the guidance notification 276. In this example, since the guidance notification 276 is generated just prior to its presentation, the guidance notification 276 can be stored in a data storage for a very short time. As a result, the navigation system 100 can improve the efficiency of the data storage usage to enhance the operation of the first device 102, the navigation system 100, or a combination thereof.

In a different example, the generator module 440 can generate the guidance notification 276 based on the guide type 236, the guide template 230, the notice distance 280, the navigation distance 238, or a combination thereof. In this example, the navigation distance 238 can decrease as the first device 102 moves toward the destination point 224. Continuing in this example, generator module 440 can generate the guidance notification 276 when the navigation distance 238 is less than or equal to the notice distance 280.

In a specific example, the generator module 440 can generate the guidance notification 276 based on the guide template 230 "Next, 'guide type 236' in 'notice distance 280'." In this specific example, the guide type 236 can represent "right turn," the notice distance 280 can represent "1,000 m," and the current instance of the navigation distance 238 determined by the navigation system 100 can represent "2,000 m." Continuing in this example, the generator module 440 can determine the value of the navigation distance 238 as the navigation distance 238 is reduced when the vehicle moves towards the destination point 224. When the value of the navigation distance 238 is reduced to 1,000 m equalizing to the notice distance 238, the generator module 440 can generate the guidance notification 276 based on inserting the guide type 236 "right turn" and the notice distance 280 "1,000 m" into the guide template 230 to generate the guidance notification 276 "Next, 'right turn' in '1,000 m'."

The generator module 440 can attach the whisper option 286 of FIG. 2B to the guidance notification 276. The generator module 440 can attach the whisper option 286 to the guidance notification 276 in various ways.

For example, the generator module 440 can attach the whisper option 286 to the guidance notification 276 based on the importance of the guide type 236. For a specific example, the generator module 440 can attach the whisper option 286 to the important instance of the guide type 236 based on comparing the guide type 236 used in the guidance notification 276 to the guide type 236 included in the priority guidance database 284 of FIG. 2B. More specifically, the important instance of the guide type 236 can include the guide type 236 listed in the priority guidance database 284. In this example, the generator module 440 can detect a match in the guide type 236 between the guide type 236 included in the guidance notification 276 and the guide type 236 included in the priority guidance database 284 to attach the whisper option 286 to the guidance notification 276.

The generator module 440 can retrieve the priority guidance database 284 in various ways. For example, the generator module 440 can retrieve the priority guidance database 284 from the first device 102, the second device 106, or a combination thereof. For example, the generator module 440 can retrieve the priority guidance database 284 by accessing the first storage unit 314, by retrieving from the first user interface 318, by retrieving from the second device 106 through the first communication unit 316, or a combination thereof.

For a specific example, the priority guidance database 284 can include the guide type 236 including the "right turn," the "left turn," the "freeway exit," the "signal on freeway," or a combination thereof. In this specific example, based on the guidance notification 276 "Next, 'freeway exit' in '1000 m'," the generator module 440 can compare and match the guide type 236 "freeway exit" to the guide type 236 "freeway exit" in the priority guidance database 284 to attach the whisper option 286 to the guidance notification 276. In a different example, for the guidance notification 276 "Next, left turn' in '500 m'," the generator module 440 can also attach the whisper option 286 to the guidance notification 276 based on the match between the guide type 236 of the guidance notification 276 and the priority guidance database 284. To the contrary, for the guidance notification 276 based on the guide type 236 not listed in the priority guidance database 284, for example, the "intersection continue straight," the generator module 440 may not attach the whisper option 286 to the guidance notification 276 since there is no match in the guide type 236.

The navigation system 100 can include a function module 450, which can couple to the generator module 440. The function module 450 operates the features of the navigation system 100. The function module 450 operates the features of the navigation system 100 in various ways. For example, the function module 450 can present the guidance notification 276 of the navigation system 100, queue the guidance notification 276, initiate the communication session 252, initialize the connection mode 264, or a combination thereof.

For a specific example, the function module 450 can present the guidance notification 276 based on prompting the guidance notification 276. In a different example, the function module 450 can queue the guidance notification 276 based on lining up the guidance notification 276. In another example, the function module 450 can initiate the communication session 252 based on opening the communication session 252. For another example, the function module 450 can initialize the connection mode 264 based on setting the connection mode 264.

The function module 450 can include a prompt module 452. The prompt module 452 presents the guidance notification 276 based on prompting the guidance notification 276 of the navigation system 100. The prompt module 452 can prompt the guidance notification 276 based on the connection mode 264, the guidance notification 276, the communication initiation information 244, the whisper option 286, the navigation distance 238, the notice distance 280, or a combination thereof. The guidance notification 276 can be prompted immediately after the guidance notification 276 is generated, queued in the prompt queue 292 of FIG. 2B, removed from the prompt queue 292, or a combination thereof by the prompt module 452.

For example, the prompt module 452 can prompt the guidance notification 276 based on the navigation distance 238, the notice distance 280, or a combination thereof if the connection mode 264 represents the standard connect mode 272. In this example, the prompt module 452 can prompt the guidance notification 276 based on the navigation distance 238 greater in value than the notice distance 280.

For a specific example, the navigation distance 238 can represent 50,000 m and the notice distance 280 can represent 10,000 m. Continuing in this specific example, the first device 102 can navigate the drive route 218 toward approaching point 234. As the first device 102 approaches the approaching point 234, the navigation distance 238 can reduce in value based on the distance along the drive route 218 between the first device 102 and the approaching point 234 getting closer. The prompt module 452 can prompt the currently generated instance of the guidance notification 276 when the distance of the navigation distance 238 reduces to match the distance of the notice distance 280. For example, the prompt module 452 can present the guidance notification 276 based on prompting the audio message, prompting the text message on the screen, or a combination thereof through the first user interface 318.

In a different example, the prompt module 452 can display the guidance notification 276 based on the navigation distance 238, the notice distance 280, or a combination thereof if the connection mode 264 represents the limited connect mode 266. For example, the prompt module 452 can present the guidance notification 276 based on comparing the navigation distance 238 and the notice distance 280. For example, the navigation distance 238 can have longer distance than the notice distance 280. For a specific example, the navigation distance 238 can represent 50,000 m and the notice distance 280 can represent 10,000 m. As the first device 102 approaches the approaching point 234, the navigation distance 238 can reduce in value. In this example, the prompt module 452 can present the guidance notification 276 if the notice distance 280 matches the navigation distance 238 as the first device 102 approaches the approaching point 234. The prompt module 452 in this example can present the guidance notification 276 by prompting the audio message, prompting the text message on the screen, or a combination thereof through the first user interface 318.

In another example, the prompt module 452 can present the guidance notification 276 based on the communication initiation information 244 if the connection mode 264 represents the limited connect mode 266. In this example, the prompt module 452 can present the guidance notification 276 based on detecting the communication initiation information 244 by the first device 102. For example, the prompt module 452 can present the guidance notification 276 by prompting the audio message, prompting the text message on the screen, or a combination thereof through the first user interface 318 based on detecting the communication initiation information 244 representing the inbound request 274. In a different example, the prompt module 452 can present the guidance notification 276 prior to initiating the communication session 252 based on detecting the communication initiation information 244 representing the outbound request 250.

It has been discovered that the navigation system 100 prompting the guidance notification 276 based on detecting the communication initiation information 244 improves the safety and efficiency of navigating the drive route 218. More specifically, by generating the guidance notification 276 based on detecting the communication initiation information 244, the navigation system 100 can prompt the guidance notification 276 prior to initiating the communication session 252. As a result, the navigation system 100 can improve the efficiency of navigating the drive route 218 by decreasing the likelihood of the operator of the first device 102 missing the guidance notification 276 and veering away from the drive route 218. Additionally, the navigation system 100 can improve the safety of operating the first device 102 through the drive route 218 by providing notice to the operator of the first device 102 based on prompting the guidance notification 276 prior to initiating the communication session 252 as opposed to during the communication session 252.

In a further example, the prompt module 452 can prompt the guidance notification 276 based on the whisper option 286 attached to the guidance notification 276 if the connection mode 264 represents the call in progress mode 268. In this example, the prompt module 452 can present the guidance notification 276 by prompting the text message representing the guidance notification 276 through the first user interface 318 when the navigation distance 238 less than or equal to the notice distance 280.

In a different example, the prompt module 452 can prompt the text message representing the guidance notification 276 based on reducing the brightness level of the text message if the whisper option 286 is attached to the guidance notification 276. For example, if the brightness of the guidance notification 276 in the text message format is displayed by the first user interface 318 such as the LCD screen is 250 candela per square meter, the prompt module 452 can modify the brightness by reducing the intensity of the lighting for the LCD screen. For a specific example, the prompt module 452 can reduce the brightness of the LCD screen by half to 125 candela per square meter from 250 candela per square meter.

In another example, the prompt module 452 can prompt the guidance notification 276 based on modifying the loudness of the guidance volume 290 of FIG. 2B. For example, the prompt module 452 can determine the loudness of the guidance volume 290 based on the connection mode 264 representing the call in progress mode 268 and the whisper option 286 attached to the guidance notification 276. In this example, if the whisper option 286 is attached to the guidance notification 276, the prompt module 452 can modify the guidance volume 290 by reducing the loudness of the guidance volume 290 in comparison to the guidance volume 290 for the guidance notification 276 generated during the standard connect mode 272 or the limited connect mode 266.

For example, the prompt module 452 can reduce the guidance volume 290 of the guidance notification 276 by half in comparison to the guidance volume 290 of the guidance notification 276 generated during the standard connect mode 272 or the limited connect mode 266. For a specific example, the prompt module 452 can prompt the guidance notification 276 at the guidance volume 290 of 60 decibels (dB) during the connection mode 264 representing the standard connect mode 272 or the limited connect mode 266. In this specific example, if the whisper option 286 is attached to the guidance notification 276 and the connection mode 264 represents the call in progress mode 268, the prompt module 452 can determine to reduce the guidance volume 290 to 30 decibels.

The prompt module 452 is not limited to reducing the guidance volume 290 by half and can modify the guidance volume 290 by any percentage. For example, the prompt module 452 can reduce or increase the guidance volume 290 based on the user entry through the first user interface 318. In a different example, the prompt module 452 can reduce or increase the guidance volume 290 based on a pre-determined value of the guidance volume 290 stored in the navigation system 100.

It has been discovered that the navigation system 100 determining the guidance volume 290 of the guidance notification 276 based on the presence of the whisper option 286 during the call in progress mode 268 improves the safety of operating the navigation system 100. For example, by determining the guidance volume 290 based on the whisper option 286 attached to the guidance notification 276, the navigation system 100 can prompt the guidance notification 276 at the guidance volume 290 tailored to the user's need. More specifically, the navigation system 100 can prompt the guidance notification 276 at a lower intensity to deliver the guidance notification 276 to the operator of the first device 102 during the communication session 252 reducing the amount of distraction. As a result, the navigation system 100 can improve the safety to enhance the personalization of operating the first device 102, the navigation system 100, or a combination thereof.

In a different example, if the connection mode 264 represents the call in progress mode 268, the prompt module 452 can prompt the guidance notification 276 based on the first device 102 in the silent state 270. In this example, the prompt module 452 can prompt the guidance notification 276 based on comparing the navigation distance 238 and the notice distance 280. For example, the prompt module 452 can compare the notice distance 280 and the navigation distance 238 as the first device 102 approaches the approaching point 234. Continuing in this example, the prompt module 452 can prompt the guidance notification 276 when the navigation distance 238 is equal to the notice distance 280 and the connection mode 264 representing the call in progress mode 268 is in the silent state 270.

In a different example, the prompt module 452 can prompt the guidance notification 276 based on detecting the communication initiation information 244 during the connection mode 264 representing the call in progress mode 268 in the silent state 270. In this different example, the prompt module 452 can prompt the guidance notification 276 based on prompting the guidance notification 276 as the audio message, the text message, or a combination thereof through the first user interface 318.

The prompt module 452 can prompt the guidance notification 276 queued in the prompt queue 292 based on the state of the first device 102 during the call in progress mode 268 representing connection mode 264. In this example, the prompt module 452 can prompt the guidance notification 276 queued in the prompt queue 292 when the first device 102 during the connection mode 264 representing the call in progress mode 268 enters the silent state 270.

It has been discovered that the navigation system 100 prompting the guidance notification 276 based on the call in progress mode 268 in the silent state 270 improves the safety and efficiency of navigating the first device 102 through the drive route 218. More specifically, by prompting the guidance notification 276 during the silent state 270 of the call in progress mode 268, the navigation system 100 can prompt the guidance notification 276 during the period of the communication session 252 when the risk of a distraction is minimal. As a result, the navigation system 100 can improve the efficiency of navigating the first device 102 by decreasing the likelihood of the first device 102 veering away from the drive route 218 caused by not receiving the guidance notification 276 prior to reaching the guidance point 226. Additionally, the navigation system 100 can improve the safety of operating the first device 102 by prompting the guidance notification 276 during silent state 270 as opposed to prompting the guidance notification 276 during the interaction 298 since the additional distraction while traversing can raise the risk of a car accident.

The function module 450 can include a queue module 454. The queue module 454 queues the guidance notification 276 in various ways. For example, the queue module 454 can queue the guidance notification 276 based on the connection mode 264, the guidance notification 276, the navigation distance 238, the notice distance 280, the communication initiation information 244, or a combination thereof.

For example, the queue module 454 can queue the guidance notification 276 generated during the connection mode 264 representing the call in progress mode 268. For a specific example, the queue module 454 can queue the guidance notification 276 based on comparing the notice distance 280 and the navigation distance 238. In this example, as the first device 102 moves toward the approaching point 234, the length of the navigation distance 238 is reduced. When the notice distance 280 and the navigation distance 238 is equal during the call in progress mode 268, the guidance notification 276 generated can be queued in the prompt queue 292. In this example, if the whisper option 286 is attached to the guidance notification 276, the queue module 454 can determine not to queue the guidance notification 276.

In a different example, the queue module 454 can queue the guidance notification 276 in the prompt queue 292 based on the connection mode 264 representing the standard connect mode 272, the limited connect mode 266, or a combination thereof. In this example, the queue module 454 can queue the newly generated instance of the guidance notification 276 if the first device 102 is prompting another instance of the guidance notification 276 when the newly generated instance of the guidance notification 276 is generated. In this example, the queue module 454 can prompt the newly generated instance of the guidance notification after another instance of the guidance notification 276 is prompted.

The queue module 454 can organize the prompt queue 292 for the guidance notification 276 in various ways. For example, the queue module 454 can organize the prompt queue 292 of the guidance notification 276 by ordering the guidance notification 276 in First In First Out (FIFO) system. In this example, the queue module 454 can order the guidance notification 276 by placing the earlier generated instance of the guidance notification 276 to be prompted prior to the later generated instance of the guidance notification 276. In another words, in this example, the queue module 454 can order the guidance notification 276 by placing the later generated instance of the guidance notification 276 to be prompted after the earlier generated instance of the guidance notification 276.

For a specific example, three instances of the guidance notification 276 can be queued in the prompt queue 292. In this specific example, based on the FIFO system, the queue module 454 can order the prompting of the guidance notification 276 in the order of the first generated instance of the guidance notification 276, the second generated instance of the guidance notification 276, and the third generated instance of the guidance notification 276.

The queue module 454 can manage the recognition of the end of the queued instance of the guidance notification 276 in various ways. For example, the information designating the end of the prompt queue 292 can be attached to the newest generated instance of the guidance notification 276 queued in the prompt queue 292. Continuing in this example, the queue module 454 can remove the information designating the end of the prompt queue 292 from the guidance notification 276 previously queued as the newest generated instance of the prompt queue 292. Finally, in this example, the queue module 454 can attach the information designating the end of the prompt queue 292 to the guidance notification 276 currently queued as the newest generated instance of the guidance notification 276 in the prompt queue 292.

In a different example, the queue module 454 can remove the guidance notification 276 from the prompt queue 292 in various ways. For example, the queue module 454 can remove the guidance notification 276 from the prompt queue 292 based on the current location 206, the drive route 218, the guidance point 226, the destination point 224, or a combination thereof. In this example, the queue module 454 can compare the physical location 208 of the current location 206 and the physical location 208 of the guidance point 226 of the guidance notification 276. If the queue module 454 determines the current location 20 to be positioned between the guidance point 226 and the destination point 224, the queue module 454 can remove the instance of the guidance notification 276 generated based on the compared instance of the guidance point 226 from the prompt queue 292.

It has been discovered that ordering the guidance notification 276 of the prompt queue 292 improves the accuracy of prompting the guidance notification 276 relevant to the user. By removing the guidance notification 276 based on the guidance point 226 already driven through by the first device 102 from the prompt queue 292, the navigation system 100 can order the guidance notification 276 to the user's need. As a result, the navigation system 100 can improve the accuracy to enhance the operation the first device 102, the navigation system 100, or a combination thereof.

The function module 450 can include a session module 456. The session module 456 initiates the communication session 252 of the navigation system 100. The session module 456 can initiate the communication session 252 based on the communication initiation information 244.

For example, the session module 456 can initiate the communication session 252 based on the communication initiation information 244 detected during the connection mode 264 representing the limited connect mode 266. In this example, the detector module 420 can monitor the first communication interface 328 to listen for the communication initiation information 244. When the communication initiation information 244 is detected, the session module 456 can initiate the communication session 252 after the prompt module 452 prompts the guidance notification 276.

For a different example, the session module 456 can initiate the communication session 252 when the communication initiation information 244 is detected during the connection mode 272 representing the standard connect mode 272. In this example, the detector module 420 can monitor the first communication interface 328 to listen for the communication initiation information 244. When the communication initiation information 244 is detected, the session module 456 can initiate the communication session 252.

The session module 456 can transceive the communication information 254 of the navigation system 100. The session module 456 can transceive the communication information 254 during the communication session 252.

For example, the session module 456 can transmit the communication information 254 generated by the first device 102 to the second device 106 through the first communication unit 316 during the communication session 252. In another example, the session module 456 can receive the communication information 254 generated by the second device 106 through the first communication unit 316 during the communication session 252.

In a different example, the session module 456 can present the inbound request 274 for initiating the communication session 252 of the navigation system 100. The session module 456 can present the inbound request 274 in various ways. For example, the session module 456 can present the inbound request 274 based on the connection mode 264, the connection threshold distance 240, the navigation distance 238, or a combination thereof.

For example, the session module 456 can present the inbound request 274 based on the first device 102 navigating through the guidance point 226. In this example, the session module 456 can present the inbound request 274 based on the connection threshold distance 240 and the navigation distance 238. For a specific example, when the inbound request 274 is detected by the detector module 420, the session module 456 can compare the connection threshold distance 240 and the navigation distance 238. In this specific example, the session module 456 can present the inbound request 274 through the first user interface 318 based on the navigation distance 238 greater than the connection threshold distance 240. The session module 456 can present the inbound request 274 using the first user interface 318 representing the speaker generating a sound. The session module 456 can also present the inbound request 274 based on the first user interface 318 representing the monitor screen generating a visual image.

Alternatively, the inbound request 274 can be queued rather than prompted by the session module 456 if the connection threshold distance 240 meets or exceeds the navigation distance 238. In this example, if the connection threshold distance 240 meets or exceeds the navigation distance 238, the session module 456 can prompt the queued instance of the inbound request 274 after the first device 102 navigates through the guidance point 226.

It has been discovered that the navigation system 100 prompting the inbound request 274 of the incoming call based on the navigation distance 238 and the connection threshold distance 240 improves the safety and efficiency of operating the first device 102. By prompting the inbound request 274 based on comparing the navigation distance 238 and the connection threshold distance 240, the navigation system 100 can avoid distracting the operator of the first device 102 by prompting the inbound request 274 immediately prior to traversing through the guidance point 226. As a result, the navigation system 100 can improve the safety of operating the first device 102, the navigation system 100, or a combination thereof. Alternatively, by prompting the queued instance of the inbound request 274 based on the navigation distance 238 and the connection threshold distance 240, the session module 456 can prevent the operator of the first device 102 from missing the incoming call. As a result, the navigation system 100 can enhance the operation the first device 102, the navigation system 100, or a combination thereof.

In another example, the session module 456 can transmit the communication initiation information 244 representing the outbound request 250 based on the navigation distance 238 and the connection threshold distance 240. For example, the session module 456 can transmit the outbound request 250 based on the navigation distance 238 exceeding the connection threshold distance 240. For a specific example, the navigation distance 238 can be 200 meters and the connection threshold distance 240 can be 50 meters. In this example, the session module 456 can transmit the outbound request 250 through the first communication interface 328 since the navigation distance 238 of 200 meters exceeds the connection threshold distance 240 of 50 meters.

Alternatively, the session module 456 can queue the transmission of the outbound request 250 if the connection threshold distance 240 meets or exceeds the navigation distance 238. For a specific example, the first device 102 can generate the outbound request 250 based on the navigation distance 238 represents 10 meters and the connection threshold distance 240 represents 50 meters. In this example, the session module 456 can queue the transmission of the outbound request 250. In this same example, the session module 456 can transmit the outbound request 250 when the first device 102 arrives at the guidance point 226.

It has been discovered that the navigation system 100 transmitting the outbound request 250 based on the navigation distance 238 and the connection threshold distance 240 improves the safety of operating the first device 102. By transmitting the outbound request 250 based on comparing the navigation distance 238 and the connection threshold distance 240, the navigation system 100 can avoid initiating the communication session 252 and distracting the operator of the first device 102 when the guidance point 226 is near when greater concentration is required for driving to avoid an accident or not veering from the drive route 218. As a result, the navigation system 100 can improve the safety of operating the first device 102, the navigation system 100, or a combination thereof.

In a different example, the session module 456 can determine the connection mode 264 of the navigation system 100 based on the communication session 252, the navigation distance 238, the mode threshold distance 262, the session terminating information 294 of FIG. 2A, or a combination thereof. For example, the session module 456 can determine the connection mode 264 representing the standard connect mode 272, the limited connect mode 266, call in progress mode 268, or a combination thereof of the navigation system 100 based on the termination of the communication session 252.

The session module 456 can determine the termination of the communication session 252 in various ways. For example, the session module 456 can determine the termination of the communication session 252 based on detecting the session terminating information 294 in the communication information 254. For a specific example, such as the communication session 252 established based on the Transmission Control Protocol (TCP), the session module 456 can detect the session terminating information 294, such as an information segment "FIN" in the data packet 246 of the communication information 254.

The session module 456 can determine the connection mode 264 of the first device 102 based on the navigation distance 238 and the mode threshold distance 262 when the communication session 252 is terminated. For example, the session module 456 can determine the connection mode 264 to represent the standard connect mode 272 based on the distance of the navigation distance 238 being greater than the mode threshold distance 262 when the session terminating information 294 is detected. In another example, the session module 456 can determine the connection mode 264 to represent the limited connect mode 266 based on the distance of the navigation distance 238 being less than or equal to the mode threshold distance 262 when the session terminating information 294 is detected.

The session module 456 can also prompt the queued instance of the guidance notification 276 based on the termination of the communication session 252. For example, the session module 456 can retrieve and prompt the queued instance of the guidance notification 276 from the first storage unit 314 based on detecting the session terminating information 294.

It has been discovered that the navigation system 100 prompting the guidance notification 276 based on the termination of the communication session 252 improves the efficiency of operating the first device 102. More specifically, by prompting the guidance notification 276 based on the termination of the communication session 252, the navigation system 100 can queue the guidance notification 276 during the communication session 252. As a result, the navigation system 100 can improve the efficiency of operating the first device 102 by decreasing the chance of missing the guidance notification 276 and veering away from the drive route 218.

The physical transformation from moving from the start point 220 to the destination point 224 results in the movement in the physical world, such as the movement by the person carrying the first device 102, the vehicle equipped with the first device 102, or a combination thereof, based on the operation of the navigation system 100. As the movement in the physical world occurs, the movement itself creates additional information that is converted back into determining the current location 206, the approaching point 234, or a combination thereof for the continued operation of the navigation system 100 and to continue the movement in the physical world.

The first software 326 of FIG. 3 of the first device 102 can include the modules for the navigation system 100. For example, the first software 326 can include the configuration module 410, the detector module 420, the mode module 430, the generator module 440, and the function module 450.

The first control unit 312 can execute the first software 326 for the configuration module 410 to obtain the navigation information 202 of FIG. 2A. The first control unit 312 can execute the first software 326 for the detector module 420 to detect the communication initiation information 244, the communication information 254, or a combination thereof. The first control unit 312 can execute the first software 326 for the mode module 430 to determine the connection mode 264. The first control unit 312 can execute the first software 326 for the generator module 440 to generate the guidance notification 276. The first control unit 312 can execute the first software 326 for the function module 450 to prompt the guidance notification 276, queue the guidance notification 276, initiate the communication session 252, and initialize the connection mode 264.

The second software 342 of FIG. 3 of the second device 106 of FIG. 3 can include the modules for the navigation system 100. For example, the second software 342 can include the configuration module 410, the detector module 420, the mode module 430, the generator module 440, and the function module 450.

The second control unit 334 of FIG. 3 can execute the second software 342 for the configuration module 410 to obtain the navigation information 202. The second control unit 334 can execute the second software 342 for the detector module 420 to detect the communication initiation information 244, the communication information 254, or a combination thereof. The second control unit 334 can execute the second software 342 for the mode module 430 to determine the connection mode 264. The second control unit 334 can execute the second software 342 for the generator module 440 to generate the guidance notification 276. The second control unit 334 can execute the second software 342 for the function module 450 to prompt the guidance notification 276, queue the guidance notification 276, initiate the communication session 252, and initialize the connection mode 264.

The modules of the navigation system 100 can be partitioned between the first software 326 and the second software 342. The second software 342 can include the generator module 440 and the function module 450. The second control unit 334 can execute modules partitioned on the second software 342 as previously described.

The first software 326 can include the configuration module 410, the detector module 420, and the mode module 430. Based on the size of the first storage unit 314, the first software 326 can include additional modules of the navigation system 100. The first control unit 312 can execute the modules partitioned on the first software 326 as previously described.

The first control unit 312 can operate the first communication interface 328 of FIG. 3 to communicate the navigation information 202, the communication information 254, communication initiation information 244, or a combination thereof to or from the second device 106 through the communication path 104 of FIG. 3. The first control unit 312 can operate the first software 326 to operate the location unit 320 of FIG. 3. The second control unit 334 can operate the second communication interface 350 of FIG. 3 to communicate the navigation information 202, the communication information 254, communication initiation information 244, or a combination thereof to or from the first device 102 through the communication path 104 of FIG. 3.

The navigation system 100 describes the module functions or order as an example. The modules can be partitioned differently. For example, the configuration module 410, the detector module 420, the generator module 440, or a combination thereof can be combined. In another example, the mode module 430, the function module 450, or a combination thereof can be combined. Each of the modules can operate individually and independently of the other modules. Furthermore, data generated in one module can be used by another module without being directly coupled to each other. For example, the mode module 430 can receive the navigation information 202 and the status information 204 from the configuration module 410. Further, "communicating" can represent sending, receiving, or a combination thereof the data generated to or from one to another.

The modules described in this application can be hardware implementation or hardware accelerators in the first control unit 312 or in the second control unit 334. The modules can also be hardware implementation or hardware accelerators within the first device 102 or the second device 106 but outside of the first control unit 312 or the second control unit 334, respectively as depicted in FIG. 3. However, it is understood that the first control unit 312, the second control unit 334, or a combination thereof can collectively refer to all hardware accelerators for the modules.

The modules described in this application can be implemented as instructions stored on a non-transitory computer readable medium to be executed by the first control unit 312, the second control unit 334, or a combination thereof. The non-transitory computer medium can include the first storage unit 314, the second storage unit 346, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 5:
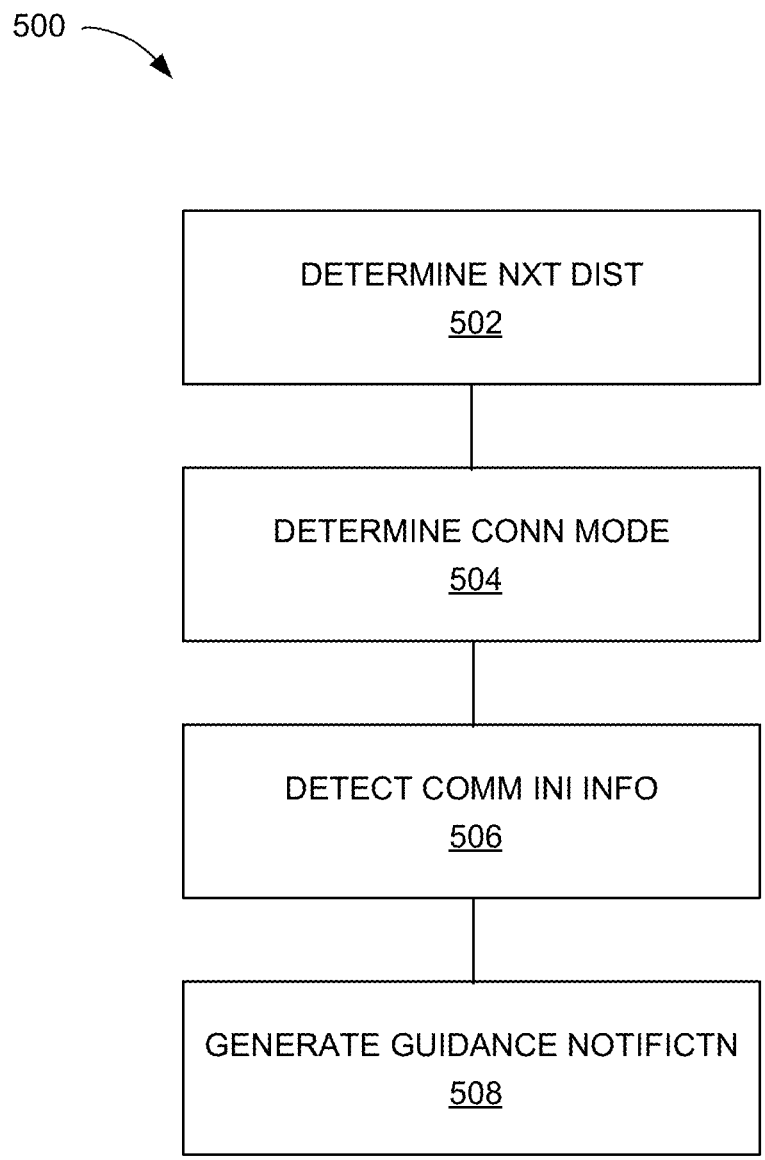
FIG. 5 is a flow chart of a method of operation of the navigation system in a further embodiment of the present invention.

Referring now to FIG. 5, therein is shown a flow chart of a method 500 of operation of the navigation system 100 in a further embodiment of the present invention. The method 500 includes: determining a navigation distance based on comparing a current location and a guidance point in a block 502; determining a connection mode based on comparing a mode threshold distance and the navigation distance in a block 504; detecting a communication initiation information for initiating a communication session in a block 506; and generating a guidance notification with a control unit based on detecting the communication initiation information during the connection mode representing the mode threshold distance meeting or exceeding the navigation distance for presenting on a device in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   determining a navigation distance based on comparing a current location and a guidance point;
   determining a connection mode based on comparing a mode threshold distance and the navigation distance;
   detecting a communication initiation information for initiating a communication session; and
   generating a guidance notification with a control unit based on detecting the communication initiation information during the connection mode representing the mode threshold distance meeting or exceeding the navigation distance for presenting on a device.

2. The method as claimed in claim 1 further comprising queuing the guidance notification based on detecting the communication initiation information during a presentation of the guidance notification.

3. The method as claimed in claim 1 wherein generating the guidance notification includes determining a guidance volume of the guidance notification based on a whisper option attached to the guidance notification.

4. The method as claimed in claim 1 further comprising removing the guidance notification in a prompt queue based on the guidance notification including the guidance point located between a start point and a current location along a drive route for presenting on the device.

5. The method as claimed in claim 1 further comprising combining the guidance notification included in a prompt queue and a generated instance of the guidance notification for presenting on the device.

6. The method as claimed in claim 1 further comprising prompting the guidance notification included in a prompt queue based on terminating the communication session, a silent state, or a combination thereof for presenting on the device.

7. The method as claimed in claim 1 further comprising presenting an inbound request based on the navigation distance meeting or exceeding a connection threshold distance for initiating the communication session.

8. The method as claimed in claim 1 further comprising transceiving the communication initiation information based on a connection threshold distance meeting or exceeding the navigation distance for initiating the communication session.

9. The method as claimed in claim 1 further comprising initiating the communication session based on detecting the communication initiation information for transceiving a communication information with the device.

10. The method as claimed in claim 1 wherein generating the guidance notification includes generating the guidance notification based on detecting the communication initiation information during transceiving of a communication information.

11. A navigation system comprising:
    a control unit for;
       determining a navigation distance based on comparing a current location and a guidance point,
       determining a connection mode based on comparing a mode threshold distance and the navigation distance,
       detecting a communication initiation information for initiating a communication session,
       generating a guidance notification based on detecting the communication initiation information during the connection mode representing the mode threshold distance meeting or exceeding the navigation distance, and
    a communication interface, coupled to the control unit, for communicating the guidance notification for presenting on a device.

12. The system as claimed in claim 11 wherein the control unit is for queueing the guidance notification based on detecting the communication initiation information during a presentation of the guidance notification.

13. The system as claimed in claim 11 wherein the control unit is for generating the guidance notification includes determining a guidance volume of the guidance notification based on a whisper option attached to the guidance notification.

14. The system as claimed in claim 11 wherein the control unit is for removing the guidance notification in a prompt queue based on the guidance notification including the guidance point located between a start point and a current location along a drive route for presenting on the device.

15. The system as claimed in claim 11 wherein the control unit is for combining the guidance notification included in a prompt queue and a generated instance of the guidance notification for presenting on the device.

16. A non-transitory computer readable medium including instructions for execution, the instructions comprising:
   determining a navigation distance based on comparing a current location and a guidance point;
   determining a connection mode based on comparing a mode threshold distance and the navigation distance;
   detecting a communication initiation information for initiating a communication session; and
   generating a guidance notification based on detecting the communication initiation information during the connection mode representing the mode threshold distance meeting or exceeding the navigation distance for presenting on a device.

17. The non-transitory computer readable medium as claimed in claim 16 further comprising queuing the guidance notification based on detecting the communication initiation information during a presentation of the guidance notification.

18. The non-transitory computer readable medium as claimed in claim 16 wherein generating the guidance notification includes determining a guidance volume of the guidance notification based on a whisper option attached to the guidance notification.

19. The non-transitory computer readable medium as claimed in claim 16 further comprising removing the guidance notification in a prompt queue based on the guidance notification including the guidance point located between a start point and a current location along a drive route for presenting on the device.

20. The non-transitory computer readable medium as claimed in claim 16 further comprising combining the guidance notification included in a prompt queue and a generated instance of the guidance notification for presenting on the device.

* * * * *